United States Patent [19]

Etoh

[11] Patent Number: 4,699,507

[45] Date of Patent: Oct. 13, 1987

[54] APPARATUS AND METHOD FOR MEASURING THE DISTANCE TO AN OBJECT

[75] Inventor: Yoshiyuki Etoh, Yokosuka, Japan

[73] Assignee: Nissan Motor Company, Limited, Yokohama, Japan

[21] Appl. No.: 716,255

[22] Filed: Mar. 26, 1985

[30] Foreign Application Priority Data

Mar. 27, 1984 [JP] Japan .................................. 59-57422

[51] Int. Cl.⁴ .............................................. G01C 3/08
[52] U.S. Cl. ...................................................... 356/5
[58] Field of Search .......................... 356/1, 5, 342, 4; 367/127

[56] References Cited

U.S. PATENT DOCUMENTS 4,174,177  11/1979  Gardner et al. ......................... 356/5

FOREIGN PATENT DOCUMENTS

58-80511   5/1983  Japan .
58-203524  11/1983 Japan .

Primary Examiner—Michael L. Gellner
Assistant Examiner—David M. Gray
Attorney, Agent, or Firm—Schwartz, Jeffery, Schwaab, Mack, Blumenthal & Evans

[57] ABSTRACT

An apparatus and method for measuring the distance to a desired light-reflecting object capable of recognizes erroneous measurements due to the presence of light-reflecting particle suspended in the air, wherein the range of intensity of reflected light achievable by airborne particles is previously stored and output of the distance to the light-reflecting object is inhibited when the intensity of reflected light falls within the above-described range of intensity of reflected light.

9 Claims, 7 Drawing Figures

APPARATUS AND METHOD FOR MEASURING THE DISTANCE TO AN OBJECT

BACKGROUND OF THE INVENTION

1. Field of the Invention

The present invention relates to an apparatus and method for measuring the distance to an object utilizing light reflected by the object and particularly to an apparatus and method therefor capable of accurate measurement of the distance to a desired reflecting object irrespective of weather conditions.

2. Description of Prior Art

Various kinds of optical measurement apparatus utilizing lasers, etc., have recently been incorporated in ranging systems such as are used in vehicles to prevent collisions with obstacles on the road and to automatically follow a vehicle at a safe distance.

The above-described measurement apparatus recognize the presence of reflecting objects such as obstacles and preceding vehicles and measure the distance thereto on the basis of propagation delay time between emission of a light pulse and recepted of the reflected light pulse. The operation of such an apparatus is disclosed in Japanese Patent Application Unexamined Open No. Sho 58-203,524.

In such distance measurement apparatus, dust and/or water drops may adhere to optical elements such as lenses or the wind-shield and so lower the accuracy of measurement.

The adverse effects of this kind of soiling are especially prevalent in cases where the measurement apparatus is mounted on a vehicle. It is necessary to disposed the optical measurement apparatus in such a way that the optical elements can be shielded from soiling. To solve the above-described problem, such an optical measurement apparatus has been proposed in Japanese Patent Application Unexamined Open No. Sho 58-80511.

The distance measurement apparatus disclosed in the above-identified Japanese Patent Application is constructed as follows.

Figure 1:
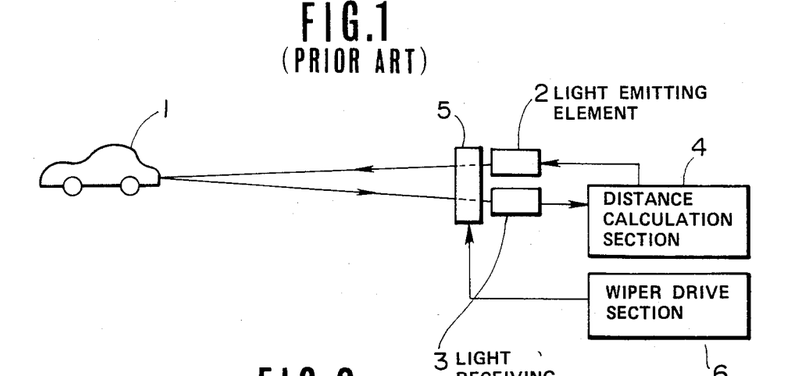
FIGS. 1 and 2 are simplified circuit block diagrams of a conventional optical distance measurement apparatus disclosed in Japanese Patent Application Unexamined Open No. Sho 58-80511.

As shown in FIG. 1, a light-emitting element 2 and light-receiving element 3 are disposed near a front windshield within a vehicle compartment to shield the optical elements from dust and precipitation. This arrangement in particular takes advantage of windshield wipers, which clear the outer surface of the front windshield of precipitation. The optical elements 2 and are positioned opposite areas of the front windshield covered by the sweep of the wiper mechanisms to ensure accurate measurement. In FIG. 1, numeral 4 denotes a distance calculation section for calculating a distance to a reflecting object based on a propagation delay of a round-trip light pulse and numeral 6 denotes a wiper driving section which drives the wiper mechanism to clear the windshield.

Figure 2:
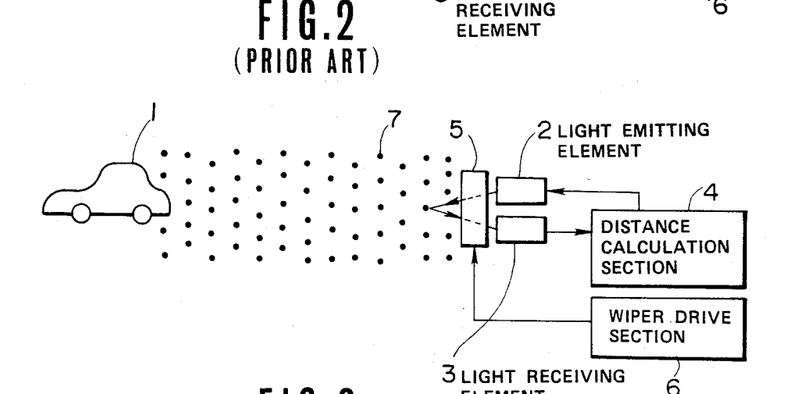

However, there is another problem in the above-described conventional distance measurement apparatus. Light transmission can also be disrupted by air-borne weather conditions such as rain, fog, snow. etc. That is as illustrated in FIG. 2, light from the light-emitting element 2 may be scattered by light reflective particles 7 suspended in the air under such weather conditions as rain, fog, or snow so that some of the light from the light-emitting element 2 is reflected by such particles 7. Consequently, the measured distance will refer to the particles 7 by which the light beam is reflected instead of the preceding vehicle 1.

SUMMARY OF THE INVENTION

It is an object of the present invention to provide a distance measurement apparatus which can accurately measure the distance between a light-emitting element of the apparatus and a target reflective object regardless of the presence of particles suspended in air due to bad weather conditions.

This can be achieved by a distance measurement apparatus and method thereof comprises: (a) first means for outputting light; (b) second means for receiving light from the first means reflected by a light-reflecting object; (c) third means for calculating the apparent distance to the light-reflecting object based on the propagation delay time required for light to travel from the first means to the light-reflecting object and then to the second means; (d) fourth means for measuring the intensity of light incident on the second means; (e) fifth means for comparing the measured intensity of light to a range of intensity achievable by light-reflective particle suspended in air: and (f) sixth means for inhibiting the third means when the intensity of light measured by the fourth means falls within the range.

BRIEF DESCRIPTION OF THE DRAWINGS

A more complete understanding of the present invention may be obtained from the drawings taken in conjuction with the following description in which.

DETAILED DESCRIPTION OF THE PREFERRED EMBODIMENT

Reference will be made to the attached drawings in order to facilitate understanding of the present invention.

FIG. 3 through 6 show one preferred embodiment of the optical distance measurement apparatus according to the present invention.

In this embodiment, the apparatus does not output a distance signal indicative of the distance between a reflective object and the vehicle when the measured distance is below a predetermined value and the reflected light intensity is below a predetermined intensity as the combination of these factors indicate that the reflecting objects are merely air-borne particles of rain, fog, or snow.

First of all, the theory of operation on the basis of which the inventive measurement apparatus determines whether or not the reflected light is derived from particles suspended in air will be described below with reference to FIG. 7.

Figure 7:
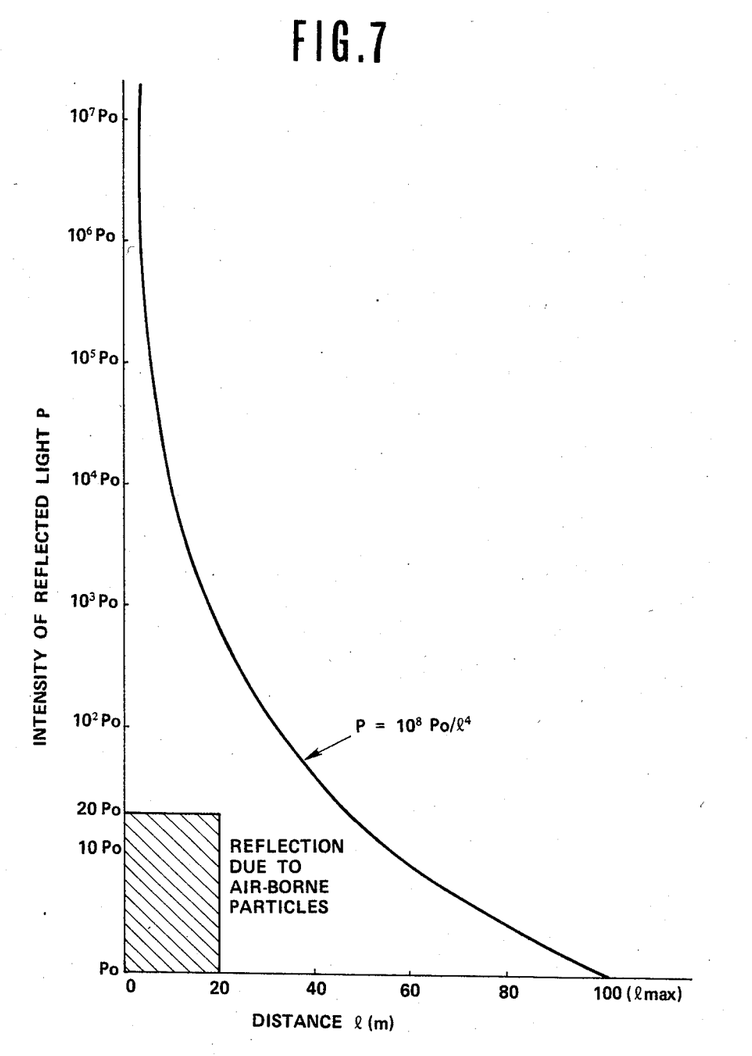
FIG. 7 is a graph of reflected light intensity P versus a distance l.

FIG. 7 shows an experimental results of a reflected light intensity P with respect to the distance l between a reflecting object and the vehicle in which the measurement apparatus according to the present invention is mounted. It should be noted that the maximum range $l_{max}$ of the distance measurement apparatus is 100 meters ($l_{max}=100(m)$). As appreciated from FIG. 7, the reflected light intensity P is inversely proportional to the fourth power of the distance l and by definition, the reflected light intensity P becomes equal to the intensity Po of reflected light at the threshold of detection when the distance l reaches $l_{max}$. Therefore, the following equation is established:

$$P=10^8 Po/l^4.$$

The attenuation of reflected light is significant in cases where particles of rain, fog, snow, etc. are suspended in air at high concentrations. In this case, the point at which the intensity of reflected light P becomes equal to the threshold intensity Po lies within 20 meters of the vehicle. The maximum intensity of reflected light in this case is 20Po. On the other hand, the intensity of reflected light P from a target object such as a preceding vehicle when no particles are suspended in the air is about $10^3$Po as shown in FIG. 7 at a distance of 20 meters. As described above, since the difference in intensity of reflected light is extremely large between light reflected by air-borne particles and that from a preceding vehicle, the measurement apparatus can determine whether the reflecting object is a preceding vehicle at the measured distance or particles in the air by comparing the intensity of reflected light and the measured distance.

Figure 3:
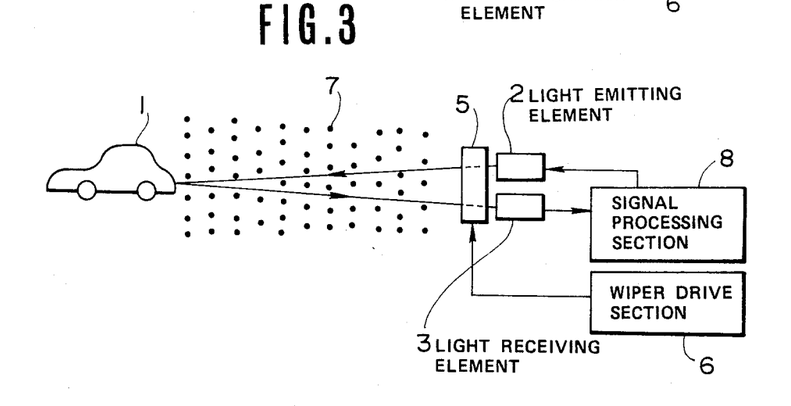
FIG. 3 is a simplified circuit block diagram of a first preferred embodiment.

FIG. 3 shows the general structure of the distance measurement apparatus in the above-described embodiment. In FIG. 3, numeral 1 denotes a preceding vehicle, the distance to which is to be measured. Numeral 2 denotes a light-emitting element. Numeral 3 denotes a light receiving element. Numeral 5 denotes a windshield wiper. Numeral 6 denotes a wiper-driving mechanism. Numeral 8 denotes a signal processing section which derives the distance to the preceding vehicle 1, the detailed circuitry of which will be described below. In FIG. 3, numeral 7 denotes particles such as rain drops. The detailed structure of the light-emitting- and -receiving elements 2 and 3 and wiper-driving mechanism 6 are exemplified in Japanese Patent Application Unexamined Open No. Sho 58-80511, the contents of which are hereby incorporated by reference.

Figure 4:
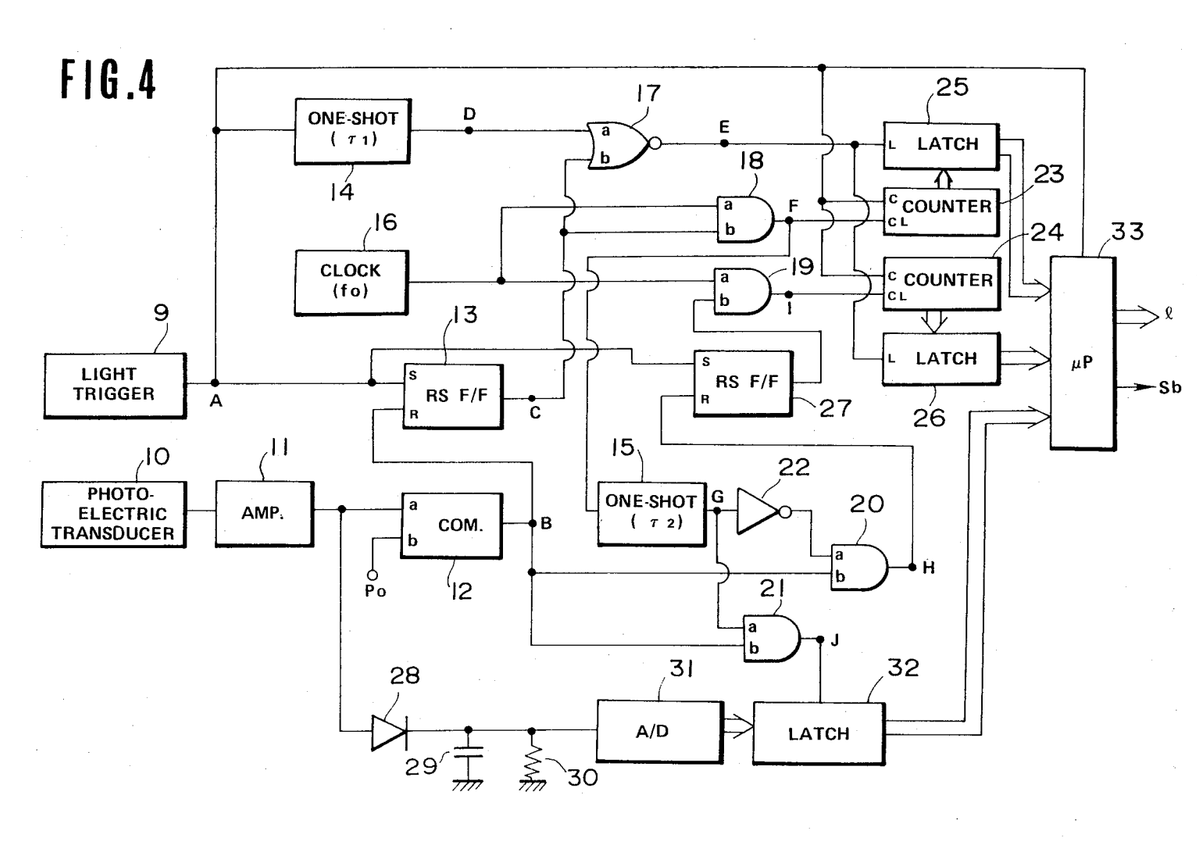
FIG. 4 is a circuit block diagram of a signal processing section shown in FIG. 3.
Figure 5:
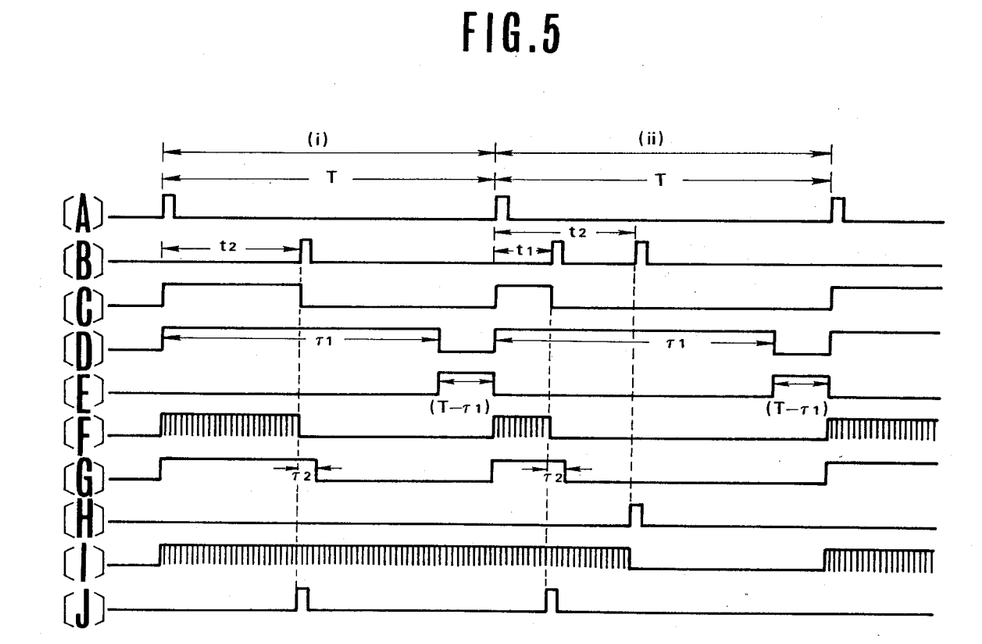
FIG. 5 is a signal timing chart for various circuits in the signal processing section shown in FIG. 4.

FIG. 4 shows a detailed circuit configuration of the signal processing section 8 shown in FIG. 3. The light-emitting element 2 includes a laser oscillator (not shown in FIG. 4) which produces a laser pulse in response to a trigger pulse generated by a light-emitting trigger pulse generator 9 at predetermined intervals of time T (refer to FIG. 5(a)). The trigger pulse is applied to the set terminals of an RS flip-flop circuits (RS F/F) 13 and 27, a one-shot multivibrator 14 which produces a high-level (H) signal for a constant period of time $\tau_1$, the clear terminal (C) of counters 23, 24, and the clock terminal of a microprocessor 33.

The light-receiving element 3 shown in FIG. 3 includes a photo-electric transducer 10 which converts the reflected light intensity into a corresponding electrical voltage. The converted electrical signal is applied to the input terminals of a comparator 12 via an amplifier 11 and an analog-to-digital converter 31 via a diode 28. It should be noted that a capacitor 29 and a resistor 30 are connected in parallel to the analog-to-digital converter 31 as shown in FIG. 4. A level at the other input terminal (b) of the comparator 12 is set to a signal level Po indicative of the minimum intensity of reflected light the apparatus can detect. Thus, the presence or absence of reflected light can be determined by comparing the converted electrical signal from the photo-electric transducer 10 to the signal Po.

The output of comparator 12 is sent to the reset terminal (R) of the RS F/F 13 and to input terminals (b, b) of two AND gate circuits 20, 21. The RS F/F 13 is set in response to trigger pulses from the light-emitting trigger pulse generating part 9 and reset in response to output signals from the comparator 12. The output signal of the RS/F/F 13 is sent to an input terminal (b) of a NOR gate circuit 17 and an input terminal (b) of an AND gate circuit 18. The other input terminal (a) of the NOR gate circuit 17 is connected to the output terminal of the one-shot multivibrator 14. The NOR circuit 17 receives the output signals from the one-shot multivibrator 14 and the RS F/F circuit 13 and outputs the NORed signal to control terminals of latch circuit 25, 26. The latch circuits 25, 26 latch the contents of counters 23 and 24, respectively, and pass the counter values on to the microprocessor 33 as latched signals. The other input terminal (a) of the AND gate circuit 19 is connected to a clock generator 16 generating a train of clock pulses having a constant frequency (fo). The result of ANDing the clock and the output signal of the RS F/F 13 is outputted to another one-shot multivibrator 15. The result of ANDing the clock and the output signal of the other RS F/F 27 is outputted to a clock terminal (CL) of the counter 24. The one-shot multivibrator outputs a high level (H) signal for a predetermined period of time $\tau_2$ in response to the input ANDed signal from the AND gate circuit 18. A reset terminal (R) of the RS F/F 27 is connected to an AND gate circuit 20. The AND gate circuit 20 receives an inverted signal from an inverter 22 and the output signal from the comparator 12. The inverter 22 inverts the output signal of one shot multivibrator 15. The output signal of one-shot multivibrator 15 is also sent to one of the input terminals (a) an AND gate circuit 21. The other input terminal (b) of the AND gate circuit 21 receives the output signal of the comparator 12. The ANDed signal from the AND gate circuit 21 is sent to a latch circuit 32 which latches the output signal of the analog to-digital converter 31 in response to the ANDed signal.

Figure 6:
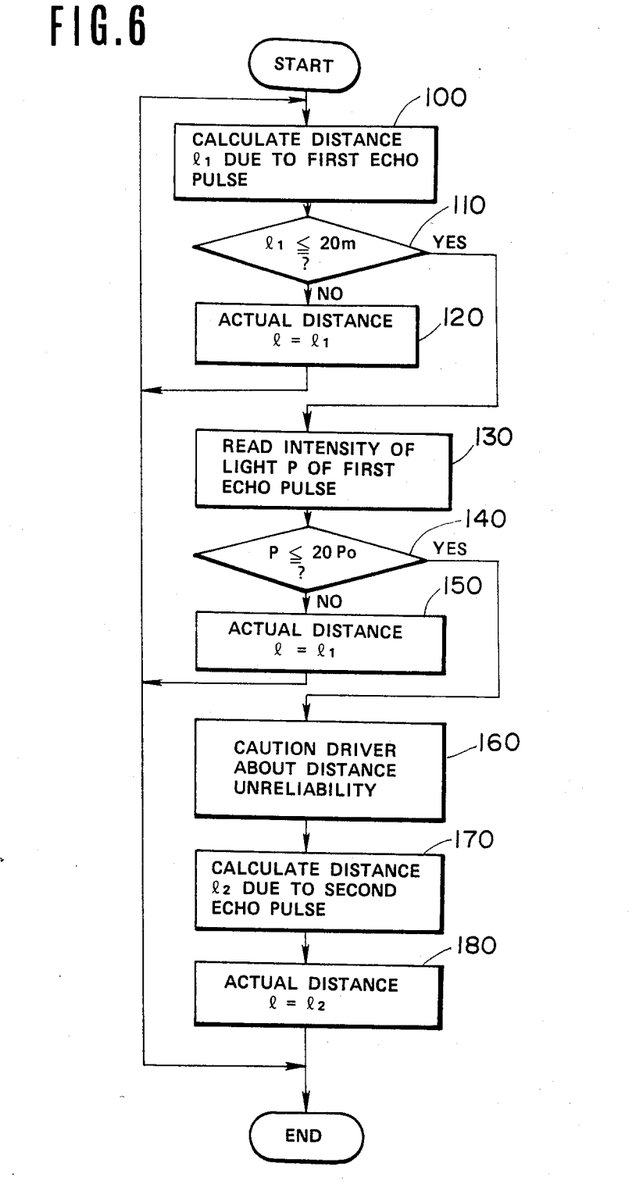
FIG. 6 is a processing flowchart illustrating the operation of the signal processing part shown in FIG. 4.

The operation of the preferred embodiment will be described in cases where air-borne rain, fog, or snow is and is not present with reference to FIGS. 5 and 6. FIG. 5 is a timing chart of the signal processing section 8, and FIG. 6 is a processing flowchart of the microprocessor 33. The microprocessor comprises a Central Processing Unit (CPU), Input/Output Port, Read-Only Memory (ROM), and Random Access Memory (RAM), as is conventional.

The operation of the preferred embodiment when visibility is good (cloudy or clear weather) will be described in detail with reference to the half of the timing chart labelled (i) in FIG. 5. The trigger generator 9 outputs a trigger pulse (refer to (A) of FIG. 5) at a regular intervals T and triggers the light-emitting element 2 to output a laser pulse. The output of the trigger pulse sets the flip-flop circuit 13 (refer to (C) of FIG. 5) so that the output terminal thereof is turned to a high level (H) and also sets the other flip-flop circuit 27. Consequently, the AND gate circuits 18 and 19 are enabled to transmit the clock from the clock generator 16. The counters 23, 24 then start counting the clock pulses sent through the AND gate circuit 18, 19, respectively (refer to (F) and (I) of FIG. 5).

The emitted laser pulse is reflected by the preceding vehicle 1 a distance l (meter) from the vehicle and the light-receiving element 3 receives the reflected laser. The received laser is then photoelectrically converted to an electrical signal, a level of which is in accordance with the received intensity of light. The photoelectrically converted electrical signal is amplified by an amplifier 11. The amplified signal is then sent to the comparator 12 and analog-to-digital converter 31. The comparator 12 compares the amplified photoelectrically converted signal with the above described signal Po indicative of the threshold intensity. If the converted signal exceeds the value of the signal Po, i.e., the intensity of received light is equal to or more than the predetermined level, an echo pulse is outputted as shown in (B) of FIG. 5. In response to the echo pulse, the RS flip-flop circuit 13 is reset to a low level (L) as shown in (C) of FIG. 5. When the RS flip-flop circuit 13 is reset, the AND gate circuit 18 prevents transmission of the clock generated by the clock generator 16 to the counter 23 as shown in (F) of FIG. 5. Therefore, the counter 23 counts the number of clock pulses received during the propagation delay time $t_2$, i.e., during a high level (H) state of the output terminal of the RS flip-flop circuit 13. Since the frequency of the clock is known, the propagation delay time $t_2$ can be calculated by the microprocessor 33 from the counted number sampled by means of the latch circuit 25 (count result times the clock pulse period). Consequently, the distance l 1 to the preceding vehicle can be derived from the following equation:

$$l = c \cdot (t_2/2),$$

wherein c denotes the speed of light. The counter value is latched only when the echo pulse is generated as shown in (B) of FIG. 5, specifically in response to the NORed signal from the NOR gate circuit 17 which receives the output signal (refer to (C) of FIG. 5) of the R/S flip-flop circuit 13. The pulsewidth $\tau_1$ shown in (D) of FIG. 5 of the signal outputted by the one-shot multivibrator 14 in response to the trigger pulse represents the light-reception window of the system. According, the value of $\tau_1$ must satisfy the following relation:

$$t_{max} < \tau_1 < i\,T$$

It should be noted that the time $t_{max}$ is the time required for the laser to propagate round-trip to the extreme range of the system ($-100$ m). Consequently, the output terminal of the NOR gate circuit 17 emits a latch command pulse of duration $(T-\tau_1)$ as shown in (E) of FIG. 5 at the end of each trigger period T. The latch circuits 25, 26 latch the contents of the respective counters 23, 24 only when the echo pulse is outputted.

Even though the AND gate circuit 18 is disabled, the output signal of the one-shot multivibrator 15 remains in a high-level (H) state as shown in (G) of FIG. 5 for the period of time $\tau_2$ following the rising edge of the echo pulse (refer to (B) of FIG. 5). The output of AND gate circuit 21 thus remains at the high-level (H) state as shown in (J) of FIG. 5 during the echo pulse (refer to (B) of FIG. 5). The latch circuit 32 receives the high-level (B) signal from the AND gate circuit 21 caused by the echo pulse and latches the photoelectrically converted signal via the analog-to-digital converter 31 and outputs it to the microprocessor 33. This latching process samples the intensity of light reflected the by the preceding vehicle 1 simultaneously with the echo pulse.

It should be noted that the AND gate circuit 20 is disabled when the one-shot multivibrator 15 is turned to a low-level (L) state and remains low as only one echo pulse in generate as shown in (H) of FIG. 5 (this will be made clearer below). Since the RS flip-flop circuit 27 remains at the high-level (H) state, the counter 24 continuously counts the clock pulses as shown in (I) of FIG. 5. The counters 23, 24 are cleared in response to the trigger pulse (refer to (A) of FIG. 5) in order to perform the subsequent distance measurement.

System operation under conditions of poor visibility due to rain, fog, or snow will be described with reference to region (ii) of FIG. 5.

The times $t_1$ and $t_2$ shown in the region (ii) of (B) of FIG. 5 denotes the propagation delay times of reflected light caught by the light-receiving element 3 due to reflection by particles 7 suspended in the air such as rain drops, fog, or snow, and due to reflection from the preceding vehicle 1, respectively. In this case, two echo pulses are outputted by the comparator 12.

The emission of the laser pulse by the light-emitting element 2 and the response of all of the circuit to the trigger pulse are the same as in the case discussed above. When the light reflected by particles in the air is received by the light-receiving element 3, the reflected light is inputted to the comparator 12 after the photoelectrical conversion and amplification. If the intensity of light reflected by air-borne particles is insufficient to trigger a high-level output from comparator 12, the same circuit operations are carried out as in response to the reflected light caused by the preceding vehicle 1 in the case (i). Thus, the propagation delay time $t_2$ and the intensity of reflected light are outputted to the microprocessor 33. On the other hand, if the intensity of light reflected by atmospheric particles reaches the level of the signal Po, the echo pulse (refer to (B) of FIG. 5) is generated after the relatively short propagation delay time $t_1$. The echo pulse resets the RS flip-flop circuit 13 (refer to (C) of FIG. 5) so that the number of clock pulses counted during the propagation delay time $t_1$ is sent to the microprocessor from the counter 23 via the latch 25. The instantaneous intensity of reflected light is read by the microprocessor 33 via the latch circuit 32 simultaneously with the first echo pulse as shown in (J) of FIG. 5.

When echo pulse for the propagation delay time $t_1$ enables the AND gate circuit 18, the one-shot multivibrator 15 turns to a low level (L) after the time $\tau_2$ has elapsed and remains at the same level until the subsequent trigger pulse as shown in (G) of FIG. 5. Thus, the AND gate circuit 20 is disabled after the first echo pulse. Then when the light reflected by the preceding vehicle 1 is received by the light-receiving element 3 and photoelectric transducer 10, a new echo pulse (refer to (B) of FIG. 5) is outputted by the comparator 12. The echo pulse is inputted to the reset terminal (R) of the RS flip-flop circuit 27 which is not reset by the echo pulse generated at the propagation delay time $t_1$ via the disabled AND gated circuit 20 as shown in (H) of FIG. 5. Thus the RS flip-flop circuit 27 is reset as shown in (I) of FIG. 5. The counter 24 still holds the number of clock pulses (refer to (I) of FIG. 5) counted during the propagation delay time $t_2$. The counted result is latched by the latch circuit 26 in response to the latch signal of the above-described NOR gate circuit 17 and sent to the microprocessor 33.

The processing flow of the microprocessor will be described with reference to FIG. 6.

The microprocessor 33 calculates the distance to the reflecting object in response to the echo pulse (refer to (B) of FIG. 5), determines whether or not the calculated distance is appropriate, i.e., whether the calculated distance is derived from the actual object to be ranged or from a false object such as particles in the air and provides a reliable value for the distance to be measured.

In a step 100, the distance $l_1$ to the reflecting object in response to the first echo pulse after the trigger pulse is calculated on the basis of the count result in the latch circuit 25. In a step 110, the microprocessor 33 compares the calculated distance $l_1$ with a predetermined distance value (e.g., 20 meters) representing the limit distance for the possibility of reflection due to particles such as rain drops, fog, or snow.

If $l_1 > 20$ meters (No) in the step 110, the microprocessor 33 recognizes that the calculated distance $l_1$ is in fact the distance to be measured to the desired object, i.e., the preceding vehicle and outputs the calculated distance value to a display unit (not shown). If $l_1 \leq 20$ meters (Yes) in the step 110, the microprocessor 33 recognizes that the calculated distance $l_1$ may be a false reading due to air-borne particles such as rain drops, fog, or snow and the routine continues to a step 130.

In the step 130, the value of the intensity of reflected light at the instant of generation of the echo pulse is read from the latch circuit and is compared with a predetermined limit value of reflected light intensity (e.g. 20Po) due to atmospheric particles such as rain drops, fog, or snow in steps 130 and 140. Consequently, if $P > 20Po$, the microprocessor 33 recognizes that the calculated distance $l_1$ is merely a measure of the optical thickness or visibility through the atmosphere and the routine goes to a step 160. In the step 160, the microprocessor 33 informs other vehicular control systems, e.g., a system for controlling intervehicle distance, e.g. by means of a signal Sb shown in FIG. 4 that the performance of the intervehicle ranging system is unreliable due to bad weather. In a step 170, the distance $l_2$ corresponding to a echo pulse following the first echo pulse is calculated on the basis of the counted result of the latch circuit 26. The distance $l_2$ is outputted to, e.g., a display unit not shown as the distance to the preceding vehicle in a step 180.

The above-mentioned system for controlling the intervehicle distance is exemplified by Japanese Patent Application Unexamined Open No. Sho 58-203,524, the contents of which is hereby incorporated by reference.

As described hereinabove, the inventive system and method for measuring the distance to a light-reflecting object on the basis of a propagation delay time between emission and return receipt of reflected light compares the intensity of received light to the limit of light intensity achievable by particles suspended in the air when the apparent distance to the ranged reflective object falls within a range of distance achievable by air-borne particles in order to prevent erroneous range readings due to the disturbing presence of air-borne particle in high concentration and so ensure accurate ranging of a target object.

It will be fully understood by those skilled in the art that the foregoing description is made in terms of the preferred embodiment and various modifications may be made without departing from the scope of the present invention, which is to be defined by the appended claims.

What is claimed is:

1. An apparatus for measuring the distance to an object, comprising:
   (a) first means for outputting light;
   (b) second means for receiving light from said first means reflected by a light-reflecting object;
   (c) third means for calculating the apparent distance to the light-reflecting object based on the propagation delay time required for light to travel from said first means to the light-reflecting object and then to said second means and outputting a distance signal indicative of the calculated apparent distance;
   (d) fourth means for measuring the intensity of light reflected by said light-reflective object incident on said second means;
   (e) fifth means for comparing the intensity of light measured by the fourth means to a range of intensity achievable by light-reflective air-borne particles suspended in air with respect to the apparent distance calculated by the third means; and
   (f) sixth means for inhibiting the output of the distance signal from said third means when the intensity of light measured by said fourth means falls within said range.

2. The apparatus according to claim 1, said third means further comprising:
   (a) seventh means for comparing the distance calculated by said third means to an upper limit apparent distance derivable from light reflected by said light reflective air-borne particles; and
   (b) eighth means for inhibiting the functions of said fourth, fifth and sixth means when the calculated distance exceeds said upper limit.

3. The apparatus according to claim 2, wherein the upper limit is substantially 20 meters.

4. The apparatus according to claim 2, wherein the fourth means measures the intensity of light incident on said second means when the calculated distance does not exceed said upper limit.

5. The apparatus according to claim 1, wherein said sixth means includes a warning signal generator which produces a warning signal when the intensity of light measured by said fourth means falls within said range.

6. A method for measuring the distance to a desired light-reflective object, comprising the steps of:
   (a) emitting light pulses toward the object at regular intervals;
   (b) monitoring the timing and intensity of light pulses reflected by the desired object;
   (c) determining whether the intensity of light reflected by the desired object exceeds a first predetermined value and outputting a signal when the intensity thereof exceeds the first predetermined value;
   (d) calculating the distance to the desired object on the basis of the timing of the reflected light in response to the signal outputted at the step (c);
   (e) determining whether the calculated distance exceeds a second predetermined value and outputting a signal indicative of the calculated distance when the calculated distance exceeds the second predetermined value;
   (f) determining whether the intensity of the reflected light pulses exceeds a third predetermined value and outputting the signal indicative of the calculated distance when the calculated distance does not exceed the second predetermined value, intensity of reflected light beam exceeding the third predetermined value; and (g) calculating the distance to the desired object on the basis of a second reflection of the light pulses in response to a subsequent signal outputted at the step (c) when the intensity thereof does not exceed the third predetermined value.

7. The method according to claim 6, wherein said step (f) includes the step of announcing that the measured distance may not be reliable when the intensity of reflected light beam does not exceed the third predetermined value.

8. The method according to claim 6, wherein said first predetermined value is a lower limit value at which the intensity of reflected light can be detected.

9. The method according to claim 6, wherein said third predetermined value is larger than said first predetermined value.

* * * * *